Figure 1:
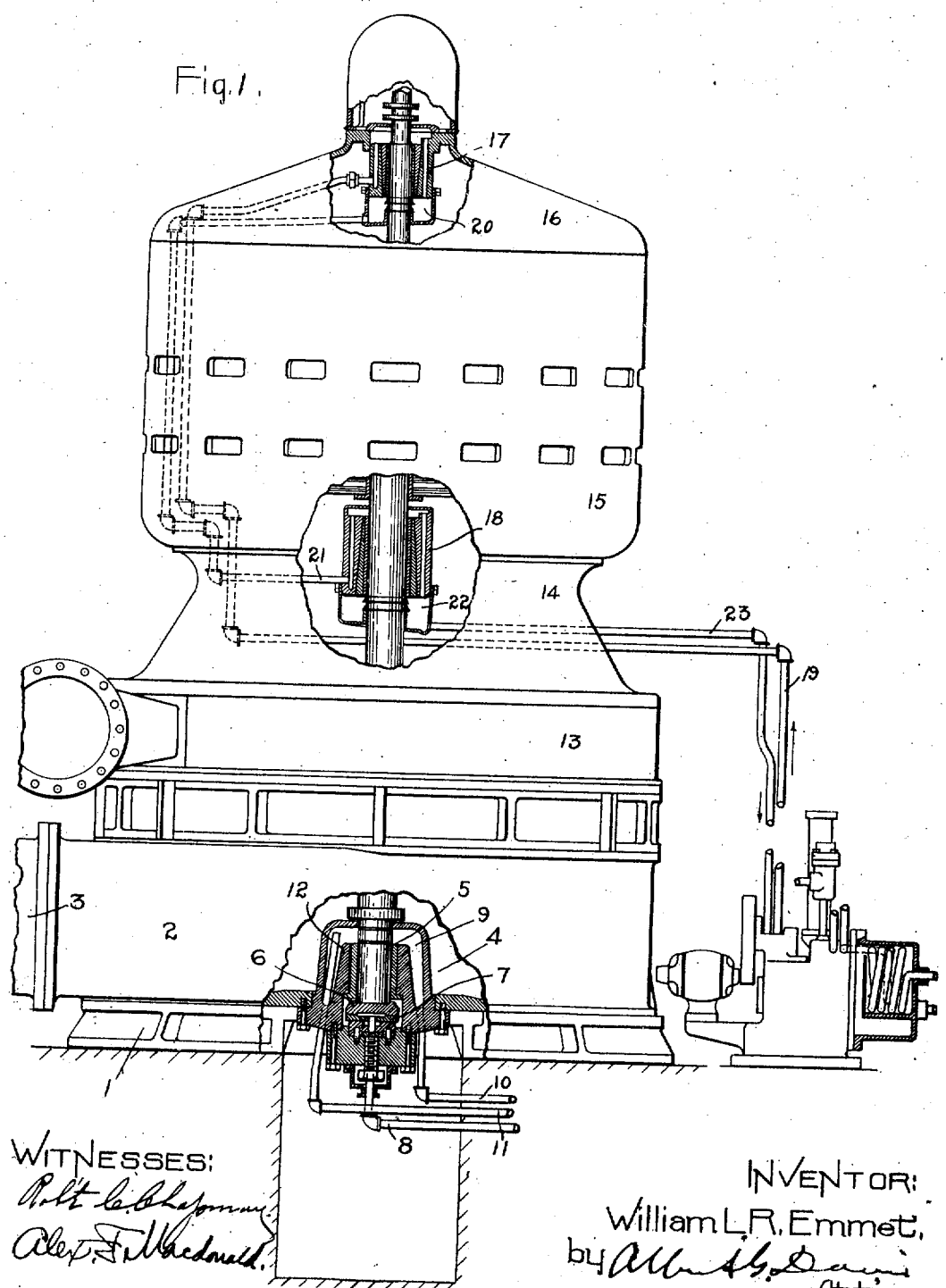

No. 847,050. PATENTED MAR. 12, 1907.
W. L. R. EMMET.
SYSTEM OF LUBRICATION FOR TURBINES.
APPLICATION FILED JUNE 22, 1903.
3 SHEETS—SHEET 1.

WITNESSES:
INVENTOR:
William L. R. Emmet,
by
Atty.

No. 847,050. PATENTED MAR. 12, 1907.
W. L. R. EMMET.
SYSTEM OF LUBRICATION FOR TURBINES.
APPLICATION FILED JUNE 22, 1903.
3 SHEETS—SHEET 2.
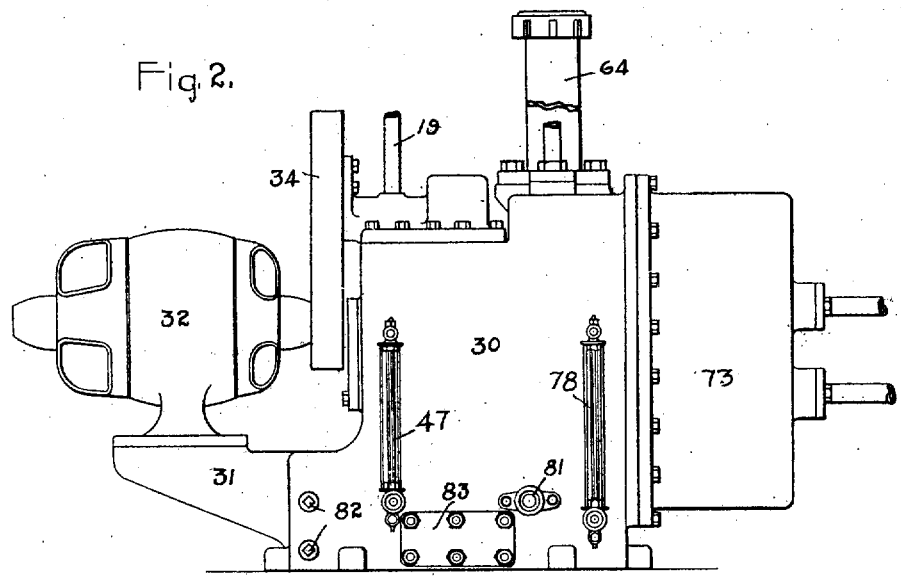
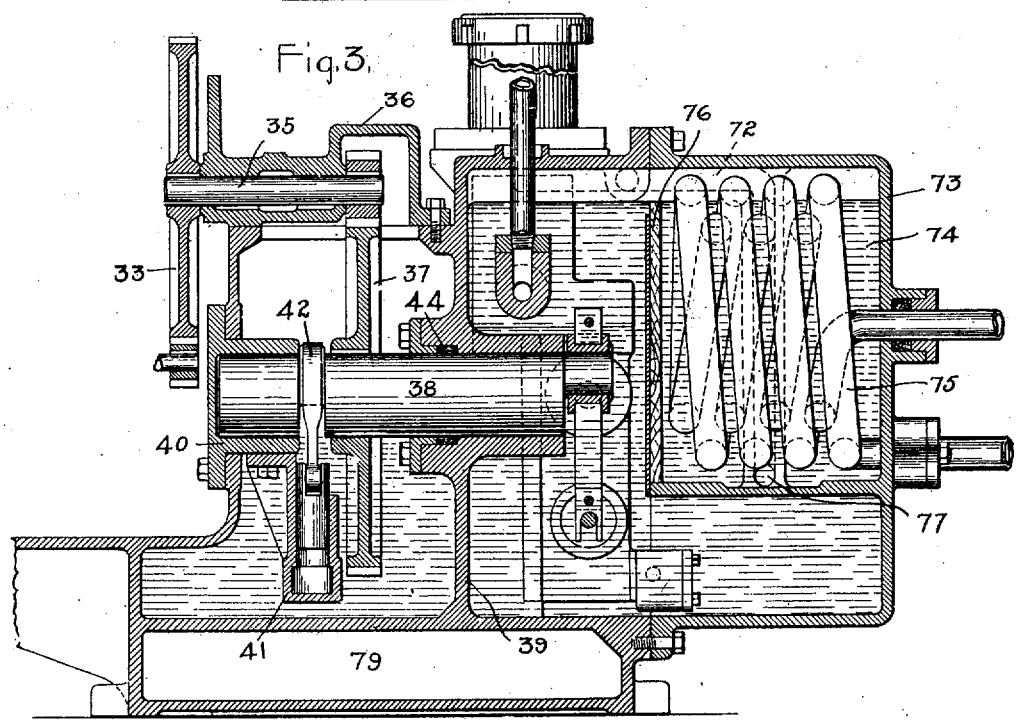
WITNESSES:
Robt C Chapman
Alex. F. Macdonald
INVENTOR:
William L. R. Emmet.
by Albert G. Davis
Atty.

No. 847,050. PATENTED MAR. 12, 1907.
W. L. R. EMMET.
SYSTEM OF LUBRICATION FOR TURBINES.
APPLICATION FILED JUNE 22, 1903.

3 SHEETS—SHEET 3.

WITNESSES:
Robt. C. Chapman
Alex. F. Macdonald

INVENTOR
William L. R. Emmet,
by Albert G. Davis
Atty.

UNITED STATES PATENT OFFICE.

WILLIAM L. R. EMMET, OF SCHENECTADY, NEW YORK, ASSIGNOR TO GENERAL ELECTRIC COMPANY, A CORPORATION OF NEW YORK.

SYSTEM OF LUBRICATION FOR TURBINES.

No. 847,050.     Specification of Letters Patent.     Patented March 12, 1907.

Application filed June 22, 1903. Serial No. 162,524.

*To all whom it may concern:*

Be it known that I, WILLIAM L. R. EMMET, a citizen of the United States, residing at Schenectady, county of Schenectady, State of New York, have invented certain new and useful Improvements in Systems of Lubrication for Turbines or other Prime Movers, of which the following is a specification.

In prior applications of mine for United States patents I have disclosed a type of elastic-fluid vertical turbines wherein the shaft is supported at its lower end by a step-bearing which is within the influence of the condenser and is held in alinement by suitable guide-bearings. Placing the bearing within the turbine-base obviates the use of packing-rings and also reduces to a minimum the opportunity for air to leak into the condenser.

My invention has for its object to provide a system of lubrication for the step and guide bearings of a turbine by means of which the bearings are properly and continuously supplied with lubricant and the lubricant prevented from mingling with the steam or other elastic fluid acted upon by the condenser.

In carrying out my invention the revolving member of the turbine is supported by a step-bearing, and as many guide-bearings are provided as are necessary to maintain the proper alinement. A pump is provided which constantly supplies lubricant to the step-bearing under such a high pressure as will maintain a thin film between the adjacent surfaces. In other words, the shaft is supported by a fluid under pressure. The pump is capable of delivering the proper amount of lubricant at all times and under the necessary high pressure. The step-bearing is located within the condenser-chamber in the base of the turbine and is therefore subjected to the effect of the condenser.

In order to prevent the condenser from drawing oil out of the bearing, and thus causing it to mingle with the exhaust-steam, an equalizing-pipe of suitable size is connected between the collection-chamber of the bearing and the reservoir or chamber on the suction side of the high-pressure pump. Care should be exercised to see that this pipe is of sufficient size to maintain equal pressures in the two chambers, even though the pressures in the chambers are subjected to sudden variations.

Owing to the fact that the step-bearing and the pump-chamber are working in a vacuum, it is necessary to provide a means for positively filling the cylinder or cylinders of the high-pressure pump. In the present case a small auxiliary or filling pump is provided for each cylinder of the main pump and is submerged in the supply-chamber. I find it preferable to provide two high-pressure pumps for the step-bearing and a single low-pressure pump for the guide-bearings, although the number of pumps in either case can be varied.

To prevent the action known as "hammering" and also to equalize the pressures of the high-pressure pumps, an equalizing-chamber is provided which includes an elastic yielding medium that acts during the portion of the stroke when the pistons are practically idle to force lubricant to the bearing.

The turbine being of the vertical type with a generator mounted thereon, I arrange the low-pressure pump to supply the upper guide-bearing, the intermediate guide-bearing being supplied by lubricant from said upper guide-bearing, reliance being placed upon the difference in level of the bearings to produce the necessary head.

For a fuller understanding of my invention attention is called to the description and claims appended thereto.

Figure 4:
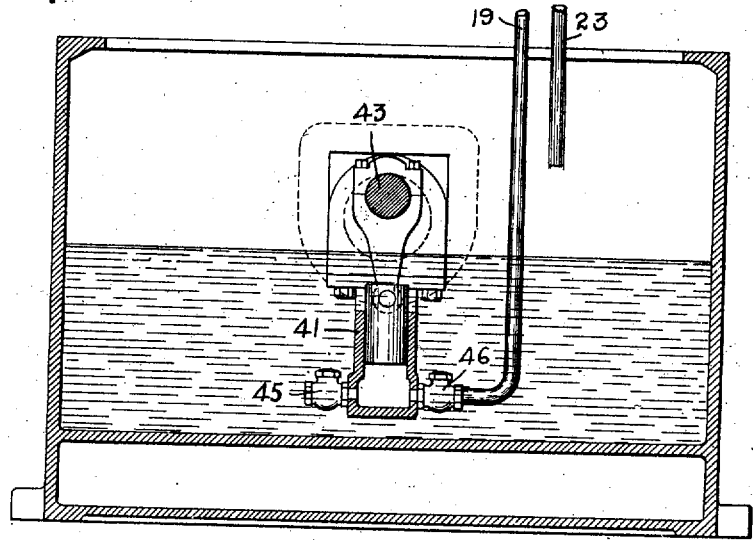
Figure 5:
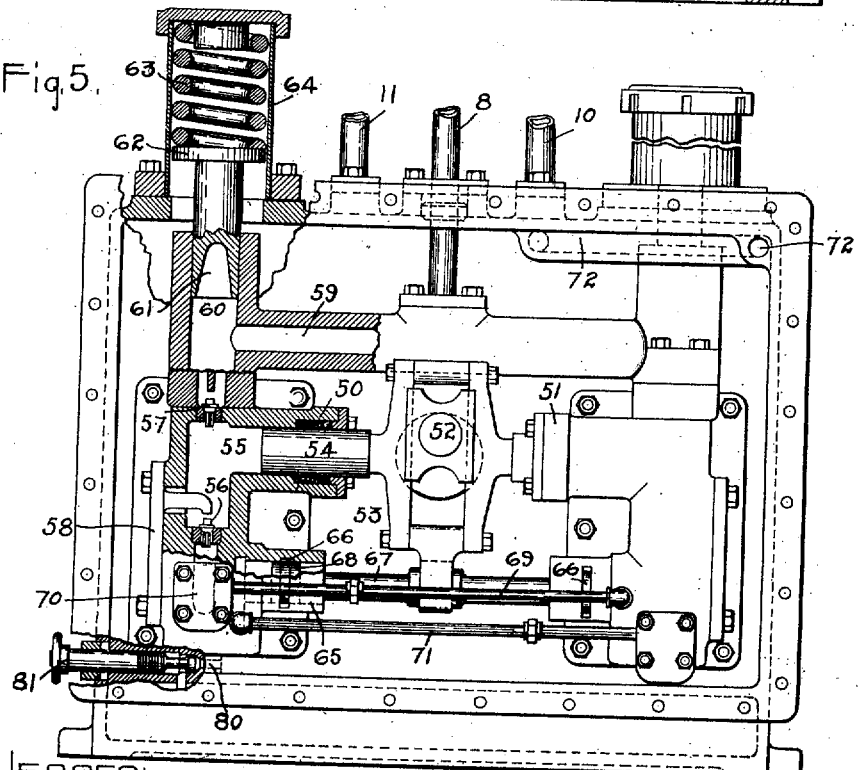

In the drawings, which illustrate one embodiment of my invention, Figure 1 is a view in elevation of a turbine with a pump for supplying lubricant to the bearings, certain of the parts being broken away for the purpose of illustration. Fig. 2 is a side elevation of the pump-casing and the driving-motor. Fig. 3 is an axial section of the pump. Fig. 4 is a transverse section thereof on the low-pressure side of the pump, and Fig. 5 is a transverse section on the high-pressure side of the pump.

1 represents the subbase of the turbine, on which is mounted a base 2, containing a condenser-chamber. The chamber is provided with a flanged opening, to which the condenser 3 is attached. The lower wall of the condenser-base 2 carries a step-bearing 4 of any approved construction. In the present instance the main shaft 5 rests on a chambered block 6, and the latter is separated when the machine is in operation from the bearing-block 7, placed directly underneath it by a film of oil or other lubricant. Oil is delivered to the chamber within the bearing-block by the high-pressure pipe 8, and the overflow from the bearing is returned from the collection-chamber 9 by the return-pipe 10. In order to equalize the pressure between the collection-chamber in the bearing and the supply-chamber in the pump-casing, with which the suction side of the high-pressure pump is connected, and prevent the lubricant from mingling with the steam, an equalizer-pipe 11 is provided. This pipe also serves to prevent the lubricant from rising in the collection-chamber above a certain level. For convenience in illustration the pump is shown on the same level with the subbase of the turbine; but it is to be understood that the pump in actual service is placed below the step-bearing. In addition to the step-bearing a guide-bearing 12 is provided, which surrounds the main shaft at the lower end and prevents lateral movement.

As the lubricant escapes from the chamber in the bearing-block 6 it passes upward between the shaft and the guide-bearing, thence into the collection-chamber 9.

Situated above the condenser-base and mounted thereon is a turbine-casing 13, made up in any suitable shape. In the present instance the turbine comprises a high and a low pressure stage. Situated above the turbine-casing and resting thereon is a stool 14, which carries a dynamo-electric machine 15, the latter being provided with a cover 16. Supported by the upper part of the structure are two guide-bearings 17 and 18. The former receives lubricant under low pressure from the pump by means of the pipe 19. After the fluid has lubricated the upper bearing it flows downward into a collection-chamber 20, forming a part of the bearing, and from this point it is conveyed to the intermediate bearing 18 by a conduit 21. The bearing 17 being some little distance above the bearing 18, there is sufficient head to cause the fluid to lubricate the second bearing. After the fluid has thoroughly lubricated the second guide-bearing it is caught in a collection-chamber 22 and returned by the pipe 23 to the pump.

Referring to Figs. 2 and 3, the construction of the pump will be described. 30 represents the pump-casing, and formed on the left-hand side thereof is a bracket 31, which supports the electric or other driving motor 32. The motor is connected to the driving-shaft of the pump by means of gearing 33, inclosed in a casing 34, the latter being bolted to a part of the pump-casing. The spur-gear, which is driven by the motor-pinion, is mounted on a shaft 35, and the latter is supported in bearings carried by the detachable cover 36 of the pump-casing. On the inner end of the shaft 35 is carried a pinion which meshes with a spur-gear 37, the latter being rigidly mounted upon the main shaft 38 of the pump. By reason of this arrangement the parts of the gearing can be readily separated by removing the bolts which secure the detachable cover 36 of the casing in place. When this is done, the interior of the chamber containing the low-pressure pump is exposed to view. The pump-casing as a whole is divided by the vertical wall 39 into two compartments, the left-hand compartment being intended for low-pressure and the right-hand for high-pressure service. The former supplies lubricant to the upper guide-bearings 17 and 18 and the latter to the step-bearing and to the lower guide-bearing located adjacent thereto. The main shaft 38 is supported in suitable bearings, one of which is formed in the dividing-wall or partition 39, while the other takes the form of a detachable flanged sleeve 40, which is bolted to the outside of the casing. The under side of the sleeve is provided with a flat surface, to which is bolted the low-pressure pump-cylinder 41. The piston for this pump is driven by a connecting-rod 42 from a crank-pin 43, Fig. 4, formed integrally with the driving-shaft.

The left-hand end of the driving-shaft is completely inclosed by the end of the flanged sleeve 40, which makes a tight fit with the casing to prevent lubricant from working out at this point. The other end of the shaft where it passes through the partition 39 is provided with a packing 44 of suitable construction.

The arrangement of the valves for the low-pressure pump is best shown in Fig. 4. The pump-cylinder 41 and its piston are completely submerged. 45 represents the suction-valve, and 46 the delivery-valve, of the pump. The latter is connected by means of the pipe 19 with the upper guide-bearing. After the oil or lubricant is passed through the bearings it is returned to the pump-chamber by the pipe 23. Situated outside of the casing and connected to the low-pressure pump-chamber is a gage 47, by means of which the level of the oil in the pump-chamber can be determined.

Referring now to the high-pressure pump which supplies lubricant to the step-bearing, in order to supply the necessary amount of lubricant two pumps 50 and 51 are provided. These pumps are similar in construction, so that a description of one of them will be sufficient. Formed on the end of the main shaft 38 is a crank-pin 52, which is provided with a suitable guide-block that is mounted in the cross-head 53. Rigidly attached to opposite sides of the cross-head are pistons 54, which reciprocate within the pump-cylinders 55.

Each pump is provided with a suction-valve 56 and a discharge-valve 57. The former is limited as to its upward movement by a projection carried by the detachable plate 58. By reason of this construction it is a simple matter when it is desired to change the lift on a valve to remove the plate and substitute either a new valve or a new plate with a different kind of projection. The plate being attached to the outside of the pump-cylinder renders it a simple matter to make this adjustment. The pumps discharge into an equalizing-chamber 59, and connected with this equalizing-chamber are one or more elastic yielding means or devices, which prevent hammering and also assist in discharging fluid into the delivery-pipe 8 when the pump-pistons are practically idle, owing to the position of the crank-pin 52. These elastic yielding means absorb energy on the power stroke and give it back on the return stroke and are similar in construction. Hence a description of one of them will suffice. The casting containing the equalizing-chamber 59 is extended upwardly to form a cylinder 60, and mounted therein is a piston 61, having a body which is cored out to enlarge the volume of the equalizing-chamber. The upper end of the piston is provided with an enlarged head 62, with which engages the coiled compression-spring 63. The head and spring are inclosed by a tube 64, which is bolted to the upper side of the pump-casing. The end of the tube is closed in by a screw-threaded cap, which also forms an abutment for the compression-spring.

Owing to the fact that the high-pressure pump is working in a more or less perfect vacuum and also to the fact that the pumps and collection-chamber in the bearing may be so located that there is only a slight difference in level, it is necessary to provide means for insuring the filling of the cylinders on the suction-strokes of the pistons. This is accomplished by means of auxiliary or filling pumps situated in the proper position with respect to the main pumps, usually below them. These pumps are driven by the crosshead 53, which also operates the main pumps. Situated below the main-pump cylinders and in line therewith are small cylinders 65, each having an opening 66 formed in the side wall thereof, through which the liquid enters. Mounted on the ends of the rod 67 are pistons 68, and as each piston moves it first draws in a certain amount of fluid and then discharges it into the pump-cylinder located on the opposite end. For example, the right-hand pump discharges into a pipe 69, which conveys the fluid to the left-hand side, thence through a chamber 70. (Shown in dotted lines.) From this point the fluid passes upwardly into the cylinder 55, at the same time raising the suction-valve 56 of the pump. The left-hand filling-pump is arranged to discharge into the pipe 71, which in turn is employed to fill the chamber of the right-hand high-pressure pump. The pumps are normally submerged in oil or other lubricant. The liquid is discharged by the pipe 8 to the step-bearing. 10 represents the return-pipe, which opens into a passage 72. (Shown in dotted lines, Figs. 3 and 5.) This passage is partially formed in the main-pump casing and partly in the detachable casing 73. The detachable casing contains a chamber 74, in which is located a coil of pipe 75, through which water or other cooling medium flows for the purpose of reducing the temperature of the oil received from the step-bearing. The coil is composed of two parts, an inner and outer, which are connected in series. Suitable stuffing-boxes are provided where the pipes extend through the casing to prevent the entrance of air or the exit of oil. Extending vertically within the chamber and adjacent to the high-pressure pumps is a partition 76, over which the oil from the chamber 74 flows. By reason of this arrangement it will be seen that oil from the step-bearing flows by the passage 72 to the bottom of the chamber and is discharged through the opening 77. From this point the heated oil rises and is gradually cooled by contact with the cooling-coil. In order to ascertain the level of the oil within the high-pressure chamber, a suitable gage 78 is provided.

Owing to the fact that the lubricant from the step-bearing is liable to have entrained with it more or less water, it is necessary to provide a means for separating them. Such a means is found in the settling-chamber 79, formed underneath the pump-chambers. This chamber communicates with the high-pressure pump-chamber through a valve-opening 80. (Shown in dotted lines, Fig. 5.) In the position shown the valve 81 is closed and communication between the two chambers is cut off. By rotating the valve backward a short distance free communication will be established between the two chambers, and the water being the heavier will run into the chamber. In order to relieve this chamber of its contents, two screw-threaded plugs 82, Fig. 2, are provided, and when it is desired to remove the contents of this chamber, especially when the step-bearing is working in a vacuum, the valve 81 is closed and the contents of the chamber removed through one of the openings covered by the plugs 82, after which the plug is returned and the valve opened. In this manner the vacuum due to the condenser 3 is not impaired, because the cubical contents of the collection or drainage chamber 79 are negligible. When it becomes necessary to thoroughly clean out the drainage or settling chamber, the cover-plate 83 is removed, which covers an opening large enough to permit the insertion of a proper device for thoroughly cleaning the interior of the chamber.

I have stated that the system is arranged to work with a vacuum in the collection-chamber 9, but under certain conditions it may work at a different pressure.

In accordance with the provisions of the patent statutes I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. In combination, a prime mover, a vacuum-chamber therefor, a bearing located therein, a pump for supplying lubricant under pressure to the bearing, a means for equalizing the pressures of the fluid discharge by the bearing and that on the suction side of the pump, and a means assisting to fill the cylinder of the pump on its suction-stroke.

2. A prime mover and a bearing therefor, in combination with pumps supplying lubricant to the bearing, an equalizing-chamber for the pumps, an elastic yielding means connected with said chamber, and a means for positively feeding fluid to the cylinders of the pumps on their suction-strokes.

3. A prime mover and a bearing therefor, in combination with pumps supplying lubricant to the bearing, an equalizing-chamber therefor, a means for positively feeding fluid to the cylinders of the pumps on their suction-strokes, and a yielding medium located between the pump and bearing and acted upon by the fluid delivered by the pumps.

4. A prime mover and a bearing therefor, in combination with a pump supplying lubricant to the bearing, a means for positively supplying fluid to the pump-cylinder on its suction-stroke, and a yielding medium which is acted upon by the fluid delivered by the pump.

5. A prime mover having a vertical shaft, a step-bearing for supporting the shaft comprising upper and lower blocks between which a film of lubricant is maintained, and guide-bearings for the shaft, in combination with a pump for supplying lubricant under pressure to the bearings, a conduit extending from an upper to a lower guide-bearing for supplying the latter with lubricant, and a conduit extending from the lower guide-bearing to the said pump.

6. A prime mover comprising a vertical shaft, a step-bearing for supporting the shaft including upper and lower blocks, between which a film of lubricant is maintained, a guide-bearing, a chamber which surrounds the step and guide bearings and receives lubricant exhausting therefrom, a pump which supplies lubricant to the step-bearing and also to the guide-bearing, and a conduit which receives lubricant from the chamber and returns it to the pump.

7. In combination, a turbine having a step-bearing, a chamber in which the bearing is located, a pump for supplying fluid under high pressure to the bearing, a supply-chamber therefor, a collection-chamber formed in the bearing, and a conduit for equalizing the fluid-pressures in the bearing and supply chambers.

8. In combination, a turbine having a step-bearing, a chamber in which the bearing is located, a pump for supplying fluid under high pressure to the bearing, a supply-chamber therefor, a collection-chamber formed in the bearing, a conduit for equalizing the pressures in the bearing and supply chambers, and a means acting in combination with the piston for forcing fluid into the pump-cylinder during the suction-stroke.

9. In combination, a turbine having a step-bearing comprising upper and lower blocks between which a film of lubricant is maintained, a guide-bearing located above the step-bearing and in proximity thereto, a pump which supplies lubricant to the step-bearing from which it flows to the guide-bearing, and a conduit which returns the lubricant to the pump after it has passed through both bearings.

10. In combination, a casing divided into compartments, a pump located in one compartment, a means for positively filling the pump-cylinder on the suction-stroke, a second pump located in the second compartment, and a driving-shaft which extends into both compartments and is common to the pumps.

11. In combination, a casing divided by a wall into compartments, a pump, a second pump for filling the first pump-cylinder on the suction-stroke, a third pump, a single driving-shaft which extends through the wall, a cross-head actuated by the shaft and connected to the first and second mentioned pumps, and a driving connection between the third pump and the shaft.

12. In combination, a pair of main-pump cylinders, pistons therefor, filling-pumps which discharge fluid into the cylinders of the main pumps on the suction-stroke, and a cross-head for producing relative movements of the pistons and cylinders of all the pumps.

13. In combination, a pump, a casing in which the pump is submerged, and a compartment formed in the casing, which receives the fluid to be pumped and permits it to overflow into the casing.

14. In combination, a pump, a casing in which the pump is submerged, a compartment formed in the casing, which receives the fluid to be pumped and permits it to overflow into the casing, and a cooling means located in said compartment.

15. In combination, a pump, a casing which incloses it, a driving-shaft for the pump located within the casing, a gear mounted thereon, a detachable cover for the casing, a shaft and gearing carried by the cover, the gearing coöperating with the gear on the driving-shaft, and a driving means for the gearing.

16. In combination, a casing, a dividing-wall therefor, pumps situated on opposite sides of the wall, a driving-shaft for the pumps, which extends through the wall, and a bearing for one end of the shaft, which is detachable from a point outside of the casing.

17. In combination, a casing, a dividing-wall therefor, a shaft which extends through the wall, pumps situated within the casing on opposite sides of the wall, means located on opposite sides of the wall for imparting motion from the shaft to the pumps, and means for rotating the shaft.

18. In combination, a casing, a pump mounted within the casing, a driving-shaft, a bearing for the shaft supported by the wall of the casing, and means for supporting the pump-cylinder from the bearing.

19. In combination, a casing, a pump located within the casing, a driving-shaft also located within the casing, bearings for the shaft supported by the walls of the casing, a propelling-motor located external to the casing, a detachable cover for the casing, a shaft carried thereby, gearing between the cover-shaft and motor, and gearing between the cover-shaft and the main driving-shaft, which is located between the pump and one of the walls of the casing.

20. In combination, a pair of main pumps, a second pair of pumps for filling the cylinders of the main pumps on their suction-strokes, a driving means which imparts corresponding movements to the main and filling pumps and conduits which convey fluid from the filling-pumps on their compression-strokes to the cylinders of the main pumps on their suction-strokes.

21. In combination, a pair of oppositely-disposed main pumps, a second pair of oppositely-disposed pumps for filling the cylinders of the main pumps, a driving means common to all of the pumps, which is located between the adjacent ends of the pump-cylinders, and a conduit which conveys fluid from each of the filling-pumps to a main pump.

22. In combination, a pair of main pumps, a second pair of pumps for forcing liquid into the cylinders of the main pumps on their suction-strokes, a driving means which imparts corresponding movements to the main and filling pumps, conduits which convey fluid from the filling-pumps on their compression-strokes to the cylinders of the main pumps on their suction-strokes, and an equalizing-chamber into which the main pumps discharge.

23. In combination, a pair of main pumps, a second pair of pumps for forcing liquid into the cylinders of the main pumps on their suction-strokes, a driving means which imparts corresponding movements to the main and filling pumps, conduits which convey fluid from the filling-pumps on their compression-strokes to the cylinders of the main pumps on their suction-strokes, an equalizing-chamber into which the main pumps discharge, and an elastic yielding device which is subjected to the pressure within the equalizing-chamber.

24. In combination, a casing, a pump located within the casing, a vacuum-chamber, a bearing within the chamber, conduits extending between the pump and the bearing and between the bearing and the casing so that the interior of the casing is subjected to the pressure of the chamber, a source of fluid-supply for the pump within the casing, a settling-chamber connected with the source of fluid-supply, and a means for closing the connection between the source and the settling-chamber when the latter is opened to the atmosphere.

25. In combination, a pump, a chamber working under a vacuum into which the pump discharges, a supply-tank for the pump connected directly with the chamber, a settling-chamber for the supply-tank, and means for closing the connection between the tank and the settling-chamber when the latter is open to atmosphere.

26. A prime mover comprising a vertical shaft, a step-bearing for supporting the weight of the shaft and attached parts comprising opposed blocks which are separated by a film of lubricant, a guide-bearing which receives lubricant after it exhausts from the step-bearing, a chamber which receives the lubricant after it passes through the step and guide bearings, a conduit for supplying fluid under pressure to the step-bearing, and a conduit which is connected with and discharges lubricant from the chamber.

In witness whereof I have hereunto set my hand this 19th day of June, 1903.

WILLIAM L. R. EMMET.

Witnesses:
BENJAMIN B. HULL,
W. M. FAIRFAX.